July 30, 1963 W. SIMPKINS 3,099,233
SUPPORT CONSTRUCTION
Filed Oct. 11, 1961

INVENTOR
WILLIAM SIMPKINS
BY
*Cohn and Powell*
ATTORNEYS

United States Patent Office 3,099,233
Patented July 30, 1963

3,099,233
SUPPORT CONSTRUCTION
William Simpkins, Creve Coeur, Mo., assignor to Tiffany Stand Company, St. Louis, Mo., a corporation of Missouri
Filed Oct. 11, 1961, Ser. No. 144,359
5 Claims. (Cl. 108—156)

This invention relates generally to improvements in a support construction, and more particularly to improvements in the structural arrangement connection of a leg with a supported member such as a table top.

It is an important object to provide a simplified construction in a support that is especially adapted for use in items of office and household furniture such as stands, chairs and tables. Of course, the support could have a wide variety of applications. The structure of the support includes a novel and advantageous manner of connecting a stand or table top to the legs so as to afford an extremely rigid and precise attachment of great strength.

An important objective is to provide a clip especially adapted for the support construction, the clip including a body having an encircling portion adapted to embrace an associated member such as a leg and terminating in spaced free end portions. A nut is attached to one of the free end portions which coacts with a cooperating fastening element to tighten the clip selectively on the associated member.

An important objective is afforded by disposing and securing the nut in an aperture formed in one of the free end portions. Other advantages are realized by the specific mounting of the nut by flaring one side of the nut against and in overlapping relation to its associated aperture margin. The other free end portion is provided with a compatible aperture aligned with the nut through which a fastening element can be inserted for operative connection with the nut.

Another important object is achieved by a support construction in which a second member is supported on a first member and attached thereto by a clip of the type previously mentioned. The body of the clip embraces the first member and lies closely adjacent the second member. A nut is attached to one free end portion that is spaced from the second member, and a fastening means interconnects the second member to the nut, the fastening means simultaneously clamping the clip tightly on the first member.

Still another important object is provided in that one of the free end portions lies closely adjacent the second member, and that the end portions and second member are provided with aligned apertures, the nut being located and attached in the aperture of the other free end portion. The fastening means extends through the aperture of the second member and the one end portion to engage the fixed nut.

Yet another important object is achieved in a stand construction by disposing a plurality of clips under the stand or table top, preferably at the corners of intersecting and depending aprons, and fixing the clips in place to such aprons so that the top can be conveniently assembled to the legs simply by inserting the top ends of the legs into the encircling portions of the clips.

Because of the particular structural arrangement of the clip wherein one free end portion of the clip is disposed closely adjacent the apron, while the other free end portion carrying the nut is spaced therefrom, the clip is drawn tightly about the leg as the fastening element, passed through the apron and one free clip end portion, is threadedly attached to the nut.

An important objective is to provide a structural connection in a support that is simple and durable in construction, economical to manufacture and assemble, efficient in operation, and which can be conveniently and advantageously utilized in many items, and being particularly useful in office furniture such as typewriter stands to give but one example.

The foregoing and other numerous objects and advantages of the invention will more clearly appear from the following detailed description of a preferred embodiment, particularly when considered in connection with the accompanying drawings, in which.

Figure 1:
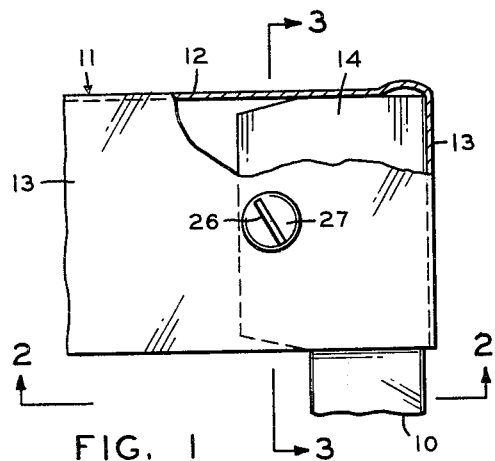
FIG. 1 is a side elevational view of the support construction, partially cut away and shown in cross section to illustrate the clip more clearly.

Referring now by characters of reference to the drawing, and first to FIGS. 1-4 inclusive, it will be noted that there is illustrated a support construction between a leg generally indicated at 10 and constituting a first member and a stand or table top generally referred to at 11 and constituting a second member. While only a single connection is illustrated, it will be readily realized that the same structural arrangement can be conveniently and advantageously utilized for all corners of any article of furniture, and indeed, can be utilized to connect a leg 10 operatively with a top 11 in other than corner constructions.

Figure 2:
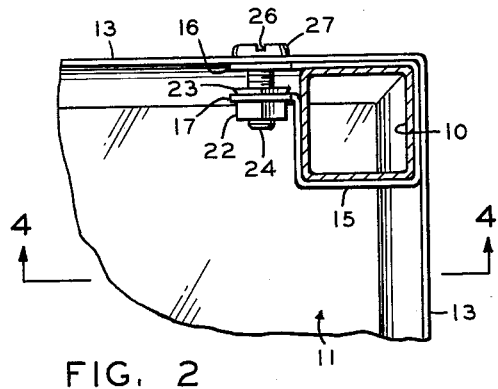
FIG. 2 is a bottom plan view, partially in cross section, as seen along line 2—2 of FIG. 1.

As is usual, the leg 10 is generally elongate having a lower end adapted to seat on a subjacent surface such as a floor while the upper or opposite end is adapted to be attached to the supported table top 11 in a manner subsequently described in detail. In the preferred embodiment, the leg 10 is tubular and is substantially square in cross section as is seen in FIG. 2.

The top 11 includes a substantially horizontal flat panel 12 having integral depending side aprons 13 as is usual, the aprons 13 intersect to provide a corner which is substantially right angular as is illustrated in FIGS. 1-4. While the top 11 constituting the second member is shown to be a stand or table top, it will be apparent that the second member 11 is not limited to this specific usage but can be any member supported by the leg 10, as for example, a seat, a shelf, or a brace among others.

Figure 5:
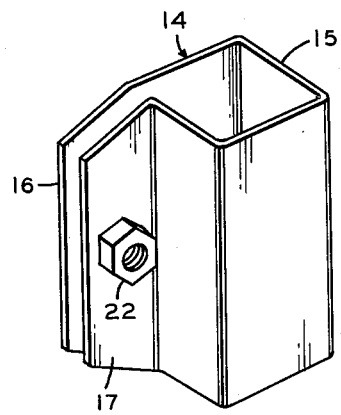
FIG. 5 is a perspective view of the clip.
Figure 4:
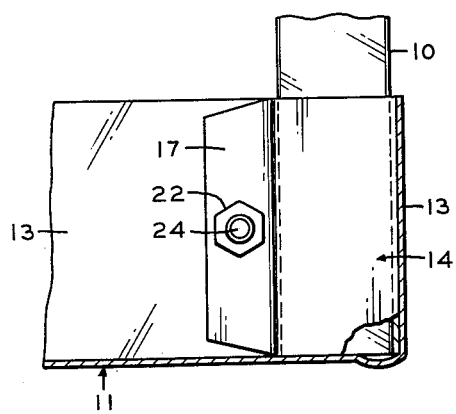
FIG. 4 is a cross sectional view as seen along line 4—4 of FIG. 2.

A clip generally indicated at 14 is utilized to fasten the top 11 operatively to the leg 10 and is best shown in overall configuration in FIG. 5. As is preferred, the clip 14 is constructed of a sheet metal body bent to form an encircling portion 15 that is substantially square in configuration to conform with the external shape of leg 10. The encircling portion 15 is adapted to embrace the leg 10 closely. Moreover, the encircling portion 15 terminates in a pair of free end portions 16 and 17 spaced laterally apart.

Figure 3:
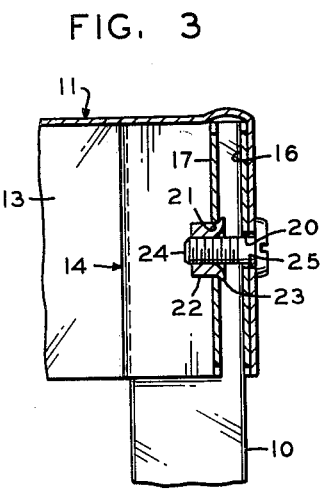
FIG. 3 is a cross sectional view as seen along line 3—3 of FIG. 1.

From FIG. 3 it is seen that the free end portion 16 is provided with an aperture 20. A slightly larger, yet compatible aperture 21 is formed in the other free end portion 17 in alignment with aperture 20. The aperture 21 is hexagonal in configuration and is adapted to receive and retain a hexagonal nut 22. As is conventional, the nut 22 is provided with an internally threaded bore.

The nut 22 is fixed to and carried by the free clip end portion 17. One side of nut 22 is swaged or flared laterally outward to provide a lip 23 that overlaps the plate margin defining aperture 21. The lip 23 holds the nut 22 in assembly with the clip end portion 17.

Also, it will be noted that the bore immediately adjacent the outwardly flared lip 23 is formed with an inwardly tapered or funnel-like formation that is adapted to guide the coacting fastening element later described into the threaded bore of nut 22 for operative connection.

In assembly, the clip 14 is inserted within the top 10, and preferably below the panel 12 and adjacent both intersecting aprons 13. As is shown in FIGS. 1–4, the clip 14 is located immediately in the corner of the intersecting aprons 13. In this position, it will be noted that the free end portion 16 lies contiguous to one apron 13 while the other free end portion 17 is spaced inwardly therefrom. The clip 14 is fixed to the top 11 by spot welding the encircling portion 15 to the aprons 13.

The leg 10 is disposed within the encircling clip portion 15. A screw bolt 24 constituting a fastening means is passed through an aperture 25 (FIG. 3) provided in apron 13 in alignment with aperture 20 formed in the free end clip portion 16. The bolt 24 slides freely through the aligned apertures 25 and 20 and operatively engages the nut 22, the tapered formation of nut 22 guides the bolt 24 into its threaded bore. Upon tightening the bolt 24 with a screw driver, as permitted by the transverse slot 26 formed in the bolt head 27, the free clip end portions 16 and 17 are brought closer together, thereby tightening the encircling clip portion 15 on the leg 10. The functional cooperation of the nut 22 with its coacting bolt 24 clamps the clip 14 tightly on the leg 10 and also securely fastens the clip 14 on the apron 13, thereby providing a rigid construction of extremely great strength.

It is thought that the functional cooperation and results of the clip 14 and the support construction in which the clip 14 is utilized, have become fully apparent from the foregoing detailed description of parts, but for completeness of disclosure, the assembly of the top 11 to the leg 10 will be briefly described.

It will be assumed that the clip 14 is located within the corner of top 11 and fixed to both aprons 13 as previously mentioned. Consequently, the clip 14 is carried by the top 11. Of course, it will be realized that only one clip arrangement is shown in FIGS. 1–4 but that any number of such clip arrangements can be utilized as needed. For example in a four cornered stand top 11, there are utilized four clip arrangements, i.e., one in each corner to accommodate a total of four vertical legs 10. The number of clips can be varied to meet each individual situation and field of usage.

The top 11 is lowered on the legs 10, each leg 10 being inserted into one of the clips 14, and specifically into the encircling portion 15 of such clip. In the embodiment shown, the upper end of leg 10 is inserted until it abuts the upper panel 12.

Then, a bolt 24 is passed through the aligned apertures 20 and 25 formed respectively in the clip end portion 16 and apron 13 and threadedly attached to nut 22. Upon tightening the bolt 24, the encircling portion 15 is clamped tightly about the leg 10, thereby fixing the leg 10 securely at the top 11.

To disassemble the leg 10 from the top 11, the procedural steps described above are simply reversed. The bolt 24 is threadedly disconnected from the nut 22. Because of the inherent resilient character of the sheet metal forming the clip 14, the free end portions 16 and 17 of the clip will spring apart thereby opening the encircling clip portion 15 at least to an extent to release the leg 10. Upon sufficient loosening of the bolt 24 or its complete removal from nut 22, the leg 10 can be slipped out of the clip 14.

Although the invention has been described by making detailed reference to a single preferred embodiment, such detail is to be understood in an instructive, rather than in any restrictive sense, many variants being possible within the scope of the claims hereunto appended.

I claim as my invention:

1. A clip comprising a body having an encircling portion terminating in spaced free end portions, said free end portions being provided with aligned apertures, and a nut located within one aperture, said nut being flared outwardly adjacent one side of its associated free end portion to hold the nut in said one aperture and said nut being provided with an outwardly divergent bore end adapted to guide an associated bolt.

2. In a support construction, a first member and a second member to be attached thereto, a clip comprising a body having an encircling portion embracing said first member and engaging said second member, said encircling portion terminating in at least one free end portion spaced from said second member, and a nut attached to said spaced free end portion, and fastening means interconnecting said second member with said nut so as to tighten said clip on said first member and to attach said clip to said second member.

3. In a support construction, a first member, a second member disposed adjacent said first member, a clip comprising a body having an encircling portion embracing said first member, said encircling portion terminating in a pair of spaced substantially parallel free end portions, one of said free end portions being contiguous to said second member, said free end portions and said second member being provided with aligned apertures, and a nut fixed in the aperture of the other said spaced free end portion, and a fastening means extending through the apertures of said second member and said one free end portion and engaging said nut.

4. In a support construction, a leg, a clip comprising a body having an encircling portion embracing said leg, said encircling portion terminating in a pair of spaced substantially parallel free end portions, a member disposed contiguous to one of said free end portions, said free end portions and said member being provided with aligned apertures, and a nut fixed in the aperture of the other said spaced free end portion, and a fastening means extending through the apertures of said member and said one free end portion and engaging said nut, whereby to tighten said clip on said leg and to attach said clip to said member.

5. In a support construction, a leg, a top panel supported on said leg, said panel having a side apron, a clip comprising a body having an encircling portion embracing said leg, means attaching said body to said top panel, said encircling body terminating in a pair of spaced parallel free end portions, one of said free end portions being disposed closely adjacent and contiguous to said apron, said apron and free end portions being provided with aligned apertures, a nut in the other said spaced free end portion, said nut being flared outwardly against one side of its associated free end portion to fix the nut in place, and a bolt extending through the apertures in said apron and the said one free end portion and engaging the said nut, said bolt and nut drawing the clip tightly about said leg and attaching the clip to said apron.

References Cited in the file of this patent

UNITED STATES PATENTS

| | | |
|---|---|---|
| 1,386,739 | Stoll et al. | Aug. 9, 1921 |
| 1,458,666 | Stoppello | June 12, 1923 |
| 1,571,601 | Richards | Feb. 2, 1926 |
| 1,895,213 | Stindl | Jan. 24, 1933 |
| 1,950,710 | Woodhull | Mar. 13, 1934 |
| 1,997,742 | Predovich | Apr. 16, 1935 |
| 2,686,559 | Stanton | Aug. 17, 1954 |